US012594853B2

(12) United States Patent
Kodama et al.

(10) Patent No.: US 12,594,853 B2
(45) Date of Patent: Apr. 7, 2026

(54) WORK VEHICLE

(71) Applicant: Yanmar Holdings Co., Ltd., Osaka (JP)

(72) Inventors: Maroi Kodama, Oakayama (JP); Shogo Suzuki, Oakayama (JP); Tomoki Ishida, Oakayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 19/072,743

(22) Filed: Mar. 6, 2025

(65) Prior Publication Data

US 2025/0282254 A1 Sep. 11, 2025

(30) Foreign Application Priority Data

Mar. 8, 2024 (JP) ................................. 2024-036079

(51) Int. Cl.
| | |
|---|---|
| *B60L 55/00* | (2019.01) |
| *B60L 50/60* | (2019.01) |
| *G05D 1/223* | (2024.01) |
| *H02J 1/14* | (2006.01) |
| *G05D 105/15* | (2024.01) |

(52) U.S. Cl.
CPC .............. *B60L 55/00* (2019.02); *B60L 50/60* (2019.02); *G05D 1/223* (2024.01); *H02J 1/14* (2013.01); *B60L 2200/40* (2013.01); *B60L 2260/00* (2013.01); *G05D 2105/15* (2024.01)

(58) Field of Classification Search
CPC ...... B60L 55/00; B60L 50/60; B60L 2200/40; B60L 2260/00; G05D 1/223; H02J 1/14
See application file for complete search history.

(56) References Cited

U.S. PATENT DOCUMENTS

| | | | | |
|---|---|---|---|---|
| 2014/0303821 A1* | 10/2014 | Oda | ...................... | H02J 7/1438 |
| | | | | 701/22 |
| 2019/0241091 A1* | 8/2019 | Lee | ........................... | B60L 7/14 |
| 2021/0387528 A1 | 12/2021 | Thompson et al. | | |

FOREIGN PATENT DOCUMENTS

| | | | | |
|---|---|---|---|---|
| EP | 3281817 A1 | 2/2018 | | |
| JP | 2019-106941 A | 7/2019 | | |
| WO | WO-2024004910 A1 * | 1/2024 | .............. | B60L 58/40 |

OTHER PUBLICATIONS

WO-2024004910-A1 Machine English Translation (Year: 2024).*
Extended Search Report, EP App. 25158342.3, dated Aug. 27, 2025.

* cited by examiner

*Primary Examiner* — Jason D Shanske
*Assistant Examiner* — Matthew James O'Neill
(74) *Attorney, Agent, or Firm* — NORTON ROSE FULBRIGHT US LLP

(57) ABSTRACT

A work vehicle provided with a traveling machine body in which a battery is disposed includes a first external power supply mode and a second external power supply mode in which electric power can be supplied from the battery to the outside of the traveling machine body. In the first external power supply mode, movement of the traveling machine body is prohibited, and in the second external power supply mode, movement of the traveling machine body is permitted.

5 Claims, 11 Drawing Sheets

WORK VEHICLE

CROSS-REFERENCE TO RELATED APPLICATION

This application claims priority under 35 U.S.C. § 119 to Japanese Application No. 2024-036079, filed on Mar. 8, 2024, the entire contents of which are hereby incorporated by reference.

TECHNICAL FIELD

The present invention relates to a work vehicle.

BACKGROUND ART

A grass mower including a traveling machine body that performs grass mowing work, and being manually operable by using a transmitter (remote control device) is known as a conventional art (see, for example, Patent Document 1).

PRIOR ART DOCUMENT

Patent Document

Patent Document 1: Japanese Unexamined Patent Application Publication No. 2019-106941

SUMMARY OF INVENTION

Technical Problem

In recent years, there has also been proposed an electric work vehicle in which a battery that stores electric power is disposed in a traveling machine body, and which is driven by using electric power stored in the battery, as an energy source. Some electric work vehicles are provided with an external power supply function that supplies electric power stored in a battery to the outside of a traveling machine body, and the traveling machine body can also be used as a (mobile) power source.

When a traveling machine body is used as a power source, it is conceivable that a user using the power source is located near the traveling machine body. However, in this case, for example, when the traveling machine body is moved due to an erroneous operation of a remote control device or the like, the traveling machine body and a person may come into contact with each other. On the other hand, if movement of the traveling machine body is restricted in a state where external power supply is possible, the user may feel inconvenience.

The present invention has been made to solve the above problems, and an object of the present invention is to provide a technique capable of securing safety and convenience of a traveling machine body in a state where external power supply is possible.

Solution to Problem

A work vehicle according to one aspect of the present invention is a work vehicle provided with a traveling machine body in which a battery is disposed. The work vehicle includes a first external power supply mode and a second external power supply mode in which electric power can be supplied from the battery to the outside of the traveling machine body. In the first external power supply mode, movement of the traveling machine body is prohibited, and in the second external power supply mode, movement of the traveling machine body is permitted.

Advantageous Effects of Invention

According to the above configuration, safety and convenience of a traveling machine body in a state where external power supply is possible can be secured.

DESCRIPTION OF EMBODIMENTS

An embodiment of the present invention is described below with reference to the drawings.

1. Schematic Configuration of Work Vehicle

Figure 1:
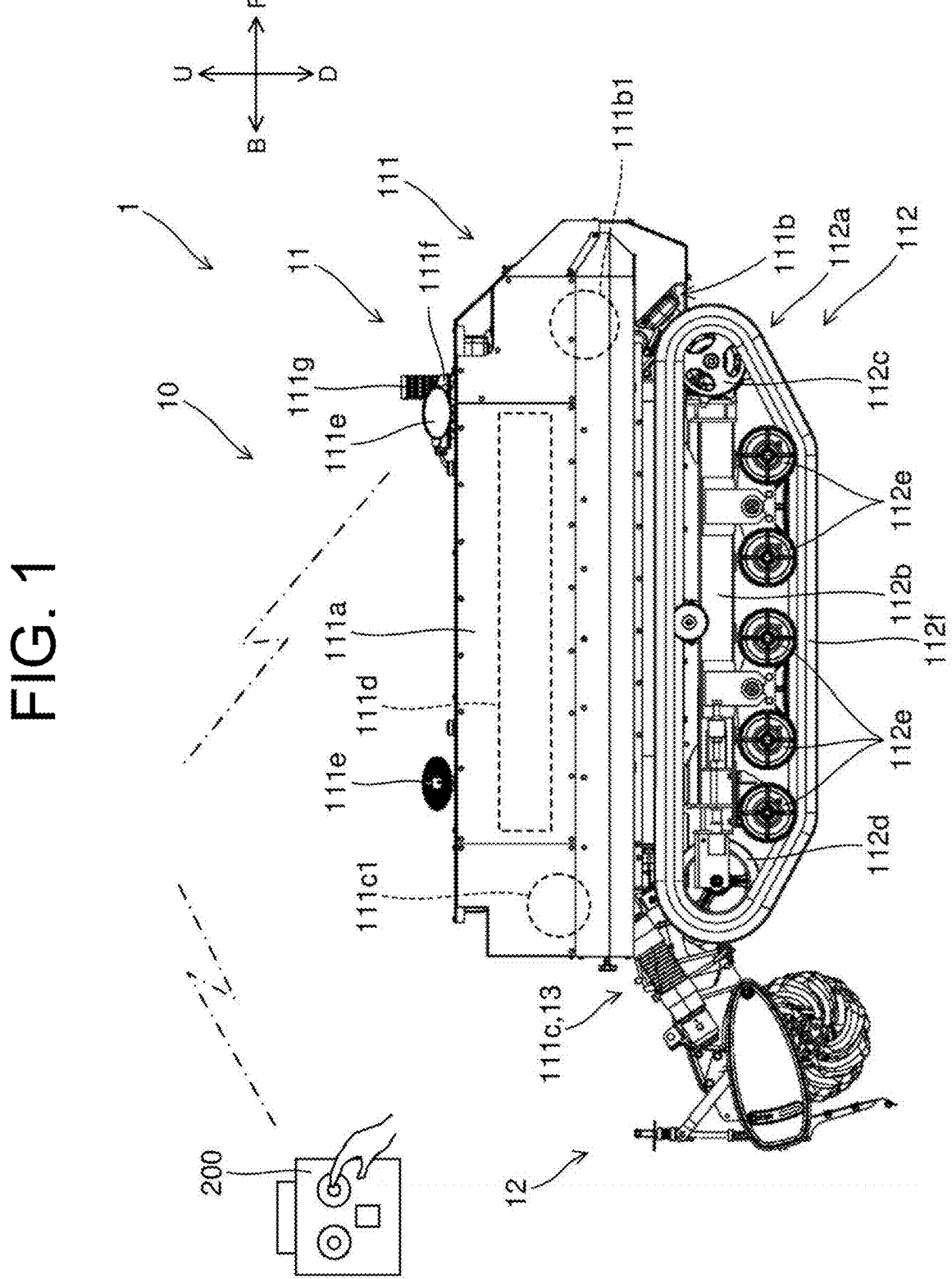
FIG. 1 is a diagram illustrating a schematic configuration of a work vehicle according to an embodiment of the present invention.

FIG. 1 is a diagram illustrating a schematic configuration of a work vehicle 1 according to an embodiment of the present invention. The work vehicle 1 is used, for example, to perform work such as agricultural work and construction work. The work vehicle 1 includes a vehicle body 10, and a remote control device 200 provided separately from the vehicle body 10.

The vehicle body 10 includes a traveling machine body 11 that travels on the ground, a work machine 12 that performs various types of work, and a hitch portion 13 that enables to connect the work machine 12 to the traveling machine body 11. That is, the work vehicle 1 includes the traveling machine body 11, the work machine 12, and the hitch portion 13.

The remote control device 200 (also referred to a remote manipulation device) allows an operator located away from the vehicle body 10 to operate the vehicle body 10 (particularly, the traveling machine body 11). That is, the traveling machine body 11 is remote controlled by the remote control device 200. A configuration of the remote control device 200 is described later.

Further, the work vehicle 1 is configured to be able to travel also by automatic traveling. That is, the work vehicle 1 is configured to be switchable between traveling (also referred to as manual traveling) by remote control, and automatic traveling. The automatic traveling means that, in the work vehicle 1, at least steering is autonomously (automatically) performed along a predetermined route (also referred to as a traveling route). Automatic traveling may be configured in such a way that, for example, at least one of adjustment of a traveling speed, and work by the work machine 12 is autonomously performed, in addition to steering. Note that, a configuration of the work vehicle 1 is not limited to the above, and, for example, traveling by remote control is enabled, and automatic traveling may be omitted.

Herein, a direction (particularly, a direction related to the vehicle body 10) used in explanation is defined as follows. One side in one direction when the traveling machine body 11 travels straight along the one direction is assumed to be "front", and the other side thereof is assumed to be "rear". A side where the hitch portion 13 is not disposed in a direction along which the traveling machine body 11 travels straight along the direction is assumed to be "front", and the opposite side (a side where the hitch portion 13 is disposed) thereof is assumed to be "rear". Further, a left side from the rear side toward the front side is assumed to be "left", and a right side is assumed to be "right". Furthermore, a gravitational direction perpendicular to the front-rear direction and the left-right direction is assumed to be an up-down direction, an upstream side in the gravitational direction is assumed to be "up", and a downstream side is assumed to be "down". In the drawings, the front is indicated by a symbol "F", the rear is indicated by a symbol "B", the right is indicated by a symbol "R", the left is indicated by a symbol "L", the up is indicated by a symbol "U", and the down is indicated by a symbol "D", as necessary. Note that, these directions are simply names to be used for explanation, and are not intended to limit an actual positional relationship and direction.

The traveling machine body 11 includes a machine body unit 111, and a traveling unit 112 disposed below the machine body unit 111.

The machine body unit 111 includes an outer cover 111a, a traveling drive device 111b, and a work machine drive device 111c.

The traveling drive device 111b is disposed on a front side of an inner portion covered by the outer cover 111a. The traveling drive device 111b includes a traveling actuator 111b1 as a drive source, and a traveling power transmission unit (not illustrated) that transmits power from the traveling actuator 111b1 to the traveling unit 112. In the present embodiment, the traveling actuator 111b1 is an electric motor. Note that, the drive source included in the traveling drive device 111b may be a drive source other than an electric motor, and may be, for example, an engine.

The work machine drive device 111c is disposed on a rear side of the inner portion covered by the outer cover 111a. The work machine drive device 111c includes a drive actuator 111c1 as a drive source, and a power take off (PTO) power transmission unit (not illustrated) that enables to transmit power from the drive actuator 111c1 to the work machine 12. That is, the traveling machine body 11 includes the drive actuator 111c1. In the present embodiment, the drive actuator 111c1 is an electric motor. Note that, the drive source included in the work machine drive device 111c may be a drive source other than an electric motor, and may be, for example, an engine. Further, in the present embodiment, an electric motor (drive source) is provided individually for the traveling drive device 111b, and the work machine drive device 111c. However, an electric motor (drive source) may be shared.

A battery 111d is accommodated inside the outer cover 111a, in addition to the traveling drive device 111b and the work machine drive device 111c. That is, the battery 111d is disposed in the traveling machine body 11. The battery 111d is constituted of, for example, a lithium-ion battery. The battery 111d may be constituted as a unit of a plurality of battery cells, or may be constituted of a single battery cell.

The battery 111d stores electric power for driving the traveling actuator 111b1, the drive actuator 111c1, and the like. Further, in the present embodiment, electric power stored in the battery 111d can be supplied to the outside of the traveling machine body 11. Herein, supplying electric power from the battery 111d to the outside of the traveling machine body 11 is referred to as "external power supply". That is, the traveling machine body 11 in the present embodiment is provided with an external power supply function that enables external power supply. Note that, in the external power supply function, two modes (a first external power supply mode, and a second external power supply mode) are provided. That is, the traveling machine body 11 includes the first external power supply mode, and the second external power supply mode. Details of the external power supply function (the first external power supply mode, and the second external power supply mode) are described later.

As an example, a light 111e, a positioning antenna 111f, an alarm lamp 111g and the like are disposed outside the outer cover 111a.

The traveling unit 112 supports the machine body unit 111 to be able to travel. Specifically, the traveling unit 112 includes a pair of left and right crawlers 112a. Each of the left and right crawlers 112a includes a truck frame 112b extending in the front-rear direction. Each truck frame 112b is mounted on a lower surface of the machine body unit 111. A drive sprocket 112c is disposed as a drive wheel at a front end of the truck frame 112b. Power is transmitted from the traveling actuator 111b1 to the drive sprocket 112c via the traveling power transmission unit included in the traveling drive device 111b. A driven sprocket 112d is disposed as a driven wheel at a rear end of the truck frame 112b. The driven sprocket 112d is supported to be pivotable on the truck frame 112b. In the truck frame 112b, a plurality of wheels 112e are supported to be pivotable between the drive sprocket 112c and the driven sprocket 112d. A crawler belt 112f is wound around the drive sprocket 112c, the driven sprocket 112d, and the plurality of wheels 112e. Thus, the crawler 112a is configured.

Each of the left and right crawlers 112a is driven by the individual traveling actuator 111b1 included in the traveling drive device 111b. When the pair of left and right crawlers 112a are simultaneously driven in the same direction, the traveling unit 112 travels straight forward or backward. Whether the traveling unit 112 travels forward or backward is determined by a rotating direction of an output shaft of the traveling actuator 111*b*1. The traveling unit 112 turns left or turns right, for example, by independently driving the pair of left and right crawlers 112*a*.

Note that, in the present embodiment, the crawler 112*a* has a configuration in which one drive wheel (drive sprocket 112*c*), and one driven wheel (driven sprocket 112*d*) are arranged side by side in the front-back direction, and the crawler belt 112*f* is wound around the drive wheel and the driven wheel. However, another configuration may be adopted. For example, a crawler may be of a type in which a crawler belt is wound around one drive wheel and two driven wheels in a triangular shape. Further, in the present embodiment, the traveling unit 112 is of a crawler type, however, the traveling unit 112 may be of a type other than a crawler type, and, for example, may be of a wheel type.

The work machine 12 is disposed behind the hitch portion 13. The hitch portion 13 is configured to include the work machine drive device 111*c*. The work machine 12 is mounted to be able to be raised and lowered with respect to the traveling machine body 11 via the hitch portion 13. That is, the work machine 12 is connected to the traveling machine body 11 via the hitch portion 13. Note that, in the present embodiment, the work machine 12 is disposed behind the traveling machine body 11. However, the present invention is not limited thereto, and, for example, the work machine 12 may be disposed in front of the traveling machine body 11.

Further, the work machine 12 is mounted to be detachable with respect to the hitch portion 13. That is, the work machine 12 is replaceable with various types of machines. In FIG. 1, the work machine 12 is a tiller. The work machine 12 may be, other than a tiller, for example, a plow, a ridge making machine, a fertilizer applicator, a pesticide spraying machine, a harvester, a mowing machine (also referred to as a grass mowing machine), a snow removing machine, and the like.

Further, the work machine 12 is driven by power to be output from the work machine drive device 111*c*. More specifically, the work machine 12 is driven by power of the drive actuator 111*c*1 to be transmitted via the PTO power transmission unit. That is, the drive actuator 111*c*1 drives the work machine 12.

Note that, in the present embodiment, the work machine 12 is connected to a rear portion of the traveling machine body 11. However, the present invention is also applicable to a work vehicle 1 in which the work machine 12 is connected to a front portion of the traveling machine body 11. Further, the present invention is also applicable to a work vehicle 1 in which the work machine 12 is detached (from the hitch portion 13).

2. Configuration of Remote Control Device

Figure 2:
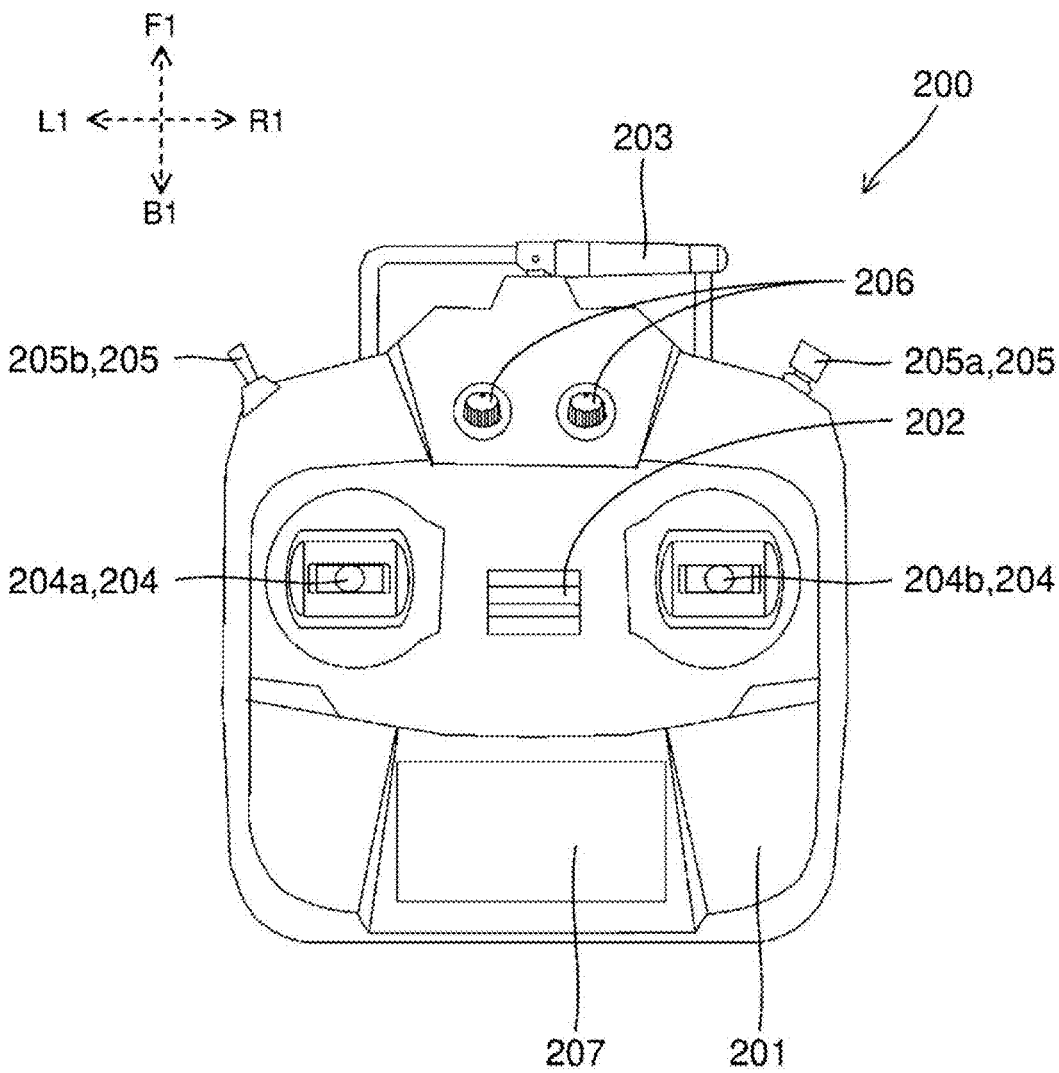
FIG. 2 is a plan view illustrating a configuration of a remote control device of the work vehicle.

A configuration of the remote control device 200 is described with reference to FIG. 2. FIG. 2 is a plan view illustrating a configuration of the remote control device 200. The remote control device 200 includes a housing 201, a power switch 202, an antenna 203, an operation lever 204, an operation switch 205, an operation knob 206, and a display unit 207.

The housing 201 constitutes a main body portion of the remote control device 200. Each of the power switch 202, the antenna 203, the operation lever 204, the operation switch 205, the operation knob 206, and the display unit 207 described above is mounted at an appropriate position of the housing 201. Note that, a layout illustrated in FIG. 2 is merely an example, and may be changed as appropriate.

The power switch 202 is provided at a middle portion on a front surface of the housing 201, and enables on and off of power supply of the remote control device 200. The power switch 202 is, for example, a seesaw switch. Note that, a power source of the remote control device 200 is, for example, a battery, a dry cell battery, or the like disposed inside the housing 201.

The antenna 203 is provided in such a way as to protrude from a side surface (an upper side surface in FIG. 2) of the housing 201, and enables wireless communication with the traveling machine body 11. In a case where power supply of the remote control device 200 is in an on-state by the power switch 202, the remote control device 200 can be wirelessly communicated with the traveling machine body 11. In a case where power supply of the remote control device 200 is in an off-state by the power switch 202, the remote control device 200 cannot communicate with the traveling machine body 11. In the present embodiment, when the traveling machine body 11 cannot communicate with the remote control device 200, the traveling machine body 11 automatically stops traveling. That is, the power switch 202 has a function as an emergency stop switch of the traveling machine body 11. Note that, an emergency stop switch may be provided separately from the power switch 202.

The operation lever 204 enables a traveling operation of the traveling machine body 11, and an operation of the work machine 12. The operation lever 204 includes a first operation lever 204*a* and a second operation lever 204*b* disposed laterally side by side with the power switch 202 interposed therebetween. The first operation lever 204*a* (a left lever illustrated in FIG. 2) can be tilted at least in two directions (F1-B1 direction and L1-R1 direction) orthogonal to each other, which are indicated by dashed arrows in FIG. 2. Further, the first operation lever 204*a* can also be tilted at least in one direction of the L1-R1 direction, while being tilted at least in one of the F1-B1 direction. Note that, the second operation lever 204*b* (a right lever illustrated in FIG. 2) can also be tilted in the same direction as the first operation lever 204*a*.

When the first operation lever 204*a* is tilted in the F1 direction, the traveling machine body 11 can be moved forward. When the first operation lever 204*a* is tilted in the B1 direction, the traveling machine body 11 can be moved backward. When the first operation lever 204*a* is tilted in the L1 direction, the traveling machine body 11 can turn left. When the first operation lever 204*a* is tilted in the R1 direction, the traveling machine body 11 can turn right.

When the second operation lever 204*b* is tilted in the F1 direction, the work machine 12 can be raised. When the second operation lever 204*b* is tilted in the B1 direction, the work machine 12 can be lowered. When the second operation lever 204*b* is tilted in the L1 direction, the traveling machine body 11 can turn left. When the second operation lever 204*b* is tilted in the R1 direction, the traveling machine body 11 can turn right.

Note that, a turning radius (turning amount) in a case where the operation lever is operated by the same operation amount (operation amount from a neutral position) is different between turning (left turn and right turn) by the first operation lever 204*a*, and turning (left turn and right turn) by the second operation lever 204*b*. More specifically, in a case where the first operation lever 204*a* and the second operation lever 204*b* are tilted by the same amount from a neutral position, the traveling machine body 11 can turn with a large turning radius when operated by the second operation lever 204*b*, as compared with a case where the traveling machine body 11 is operated by the first operation lever 204*a*. That is, the traveling machine body 11 can be gently turned by the second operation lever 204*b*. Note that, a configuration of the first operation lever 204*a* and the second operation lever 204*b* is not limited to the above. For example, it may be configured in such a way that the traveling machine body 11 is gently turned by the first operation lever 204*a*, as compared with a case of using the second operation lever 204*b*.

The operation switch 205 includes a first operation switch 205*a*, and a second operation switch 205*b*. The first operation switch 205*a* is disposed on a side surface (an upper right side surface in FIG. 2) of the housing 201, and enables a plurality of types of settings related to automatic traveling. The plurality of types of settings include, for example, start setting and finish setting on automatic traveling. The first operation switch 205*a* is, for example, a momentary switch that can be pressed down.

The second operation switch 205*b* is disposed on a side surface (an upper left side surface in FIG. 2) of the housing 201, and enables on and off of driving of the work machine 12. That is, when the second operation switch 205*b* is operated, on and off of driving of the drive actuator 111*c*1 is switched. The second operation switch 205*b* is, for example, a toggle switch.

The operation knob 206 is disposed on a front surface (an upper side of a front surface in FIG. 2) of the housing 201, and enables adjustment of a maximum speed of the traveling machine body 11. More specifically, two operation knobs 206 are provided. One of the two operation knobs 206 enables adjustment of a maximum speed of the traveling machine body 11 at a time of straight traveling. The other of the two operation knobs 206 enables adjustment of a maximum speed of the traveling machine body 11 at a time of traveling while turning.

The display unit 207 is disposed on a front surface (a lower side of the front surface in FIG. 2) of the housing 201, and displays various pieces of information to be notified to an operator. The various pieces of information include, for example, indication of a traveling speed of the traveling machine body 11, and the like. The display unit 207 is, for example, a liquid crystal display device, an organic EL display device, and the like.

3. Configuration of Electrical System and Hydraulic System of Work Vehicle

Figure 3:
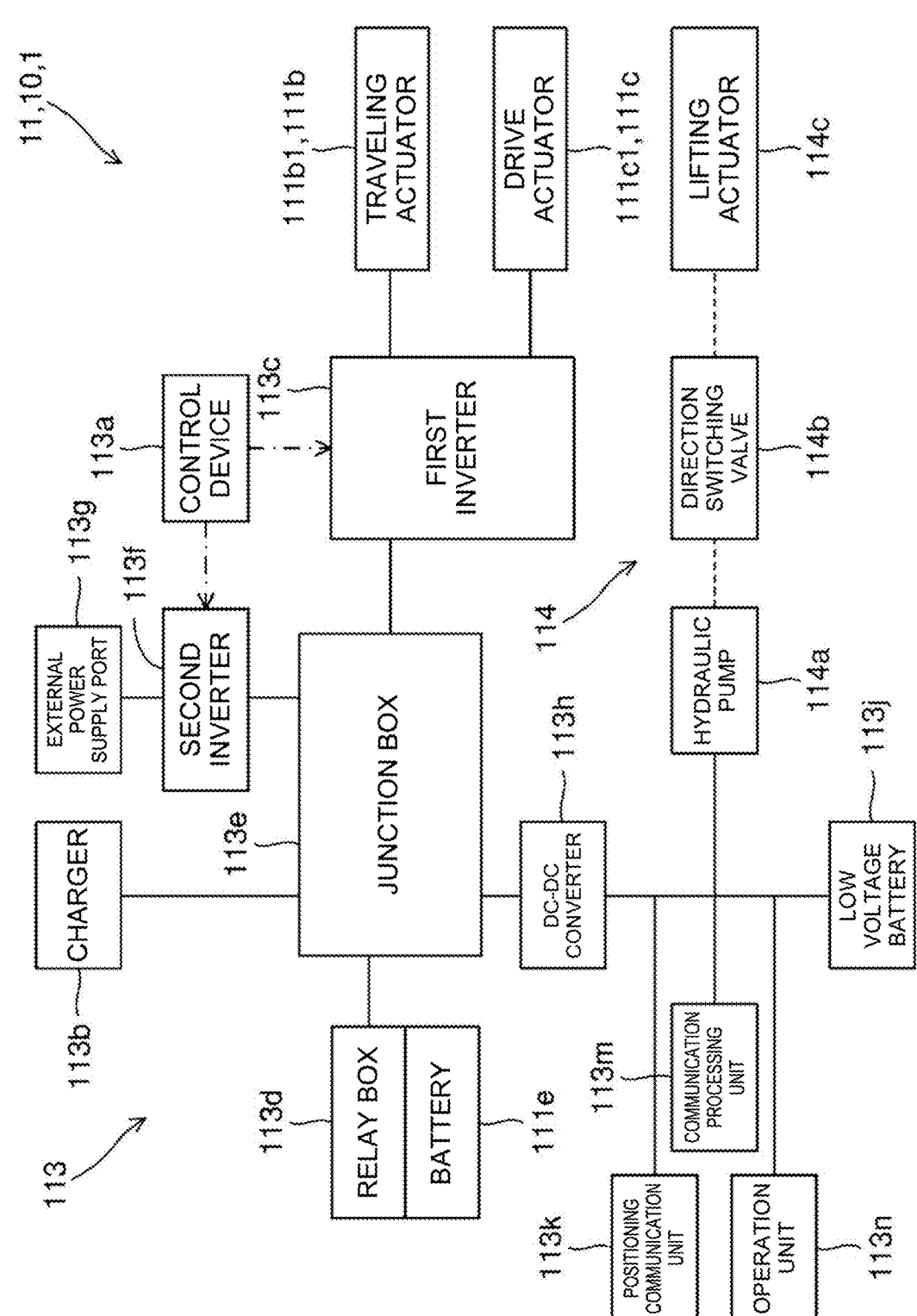
FIG. 3 is a block diagram schematically illustrating a configuration of an electrical system and a hydraulic system of the work vehicle.

A configuration of an electrical system and a hydraulic system of the work vehicle 1 is described with reference to FIG. 3. FIG. 3 is a block diagram schematically illustrating a configuration of an electrical system and a hydraulic system of the work vehicle 1. Note that, in FIG. 3, a solid line indicates an electric power supply path, a dashed line indicates a hydraulic oil supply path, and one-dot chain line indicates a signal path.

The work vehicle 1 includes a plurality of pieces of electric equipment 113, and a plurality of pieces of hydraulic equipment 114. The plurality of pieces of electric equipment 113 include a control device 113*a*, a charger 113*b*, a first inverter 113*c*, a relay box 113*d*, a junction box 113*e*, a second inverter 113*f*, an external power supply port 113*g*, a DC-DC converter 113*h*, a low voltage battery 113*j*, a positioning communication unit 113*k*, a communication processing unit 113*m*, and an operation unit 113*n*. The plurality of pieces of electric equipment 113 are disposed in the machine body unit 111 (see FIG. 1) of the traveling machine body 11.

The plurality of pieces of electric equipment 113 receive electric power supply from the battery 111*d*. More specifically, each piece of equipment included in the plurality of pieces of electric equipment 113 is directly connected to the battery 111*d*, or electrically connected to the battery 111*d* via another piece of equipment included in the plurality of pieces of electric equipment 113. For example, the relay box 113*d* included in the plurality of pieces of electric equipment 113 is directly connected to the battery 111*d*. Further, the first inverter 113*c* included in the plurality of pieces of electric equipment 113 is electrically connected to the battery 111*d* via the relay box 113*d*, and the junction box 113*e*.

The control device 113*a* is a computer device that performs electrical control of each unit of the work vehicle 1. A configuration of the control device 113*a* is described later. The charger 113*b* converts alternate-current voltage to be supplied from an external power source (not illustrated) via a charging cable (not illustrated) into direct-current voltage. Note that, a charging port (not illustrated) for connecting the charging cable is provided in the machine body unit 111 of the traveling machine body 11.

The first inverter 113*c* converts direct-current voltage to be supplied from the battery 111*d* into alternate-current voltage, and supplies the alternate-current voltage to the traveling actuator 111*b*1, and the drive actuator 111*c*1. Thus, the traveling actuator 111*b*1 and the drive actuator 111*c*1 are driven. Supply of alternate-current voltage from the first inverter 113*c* to the traveling actuator 111*b*1, and the drive actuator 111*c*1 is performed based on a rotation command to be output from the control device 113*a*.

The relay box 113*d* is a battery control unit that controls input/output of the battery 111*d* by controlling an internal battery relay. The junction box 113*e* is configured to include a charger relay, an inverter relay, a fuse, and the like. Voltage to be output from the charger 113*b* is supplied to the battery 111*d* via the junction box 113*e*, and the relay box 113*d*. Thus, electric power is stored in the battery 111*d*. Further, voltage to be output from the battery 111*d* is supplied to the first inverter 113*c* via the relay box 113*d*, and the junction box 113*e*. In addition to the above, voltage to be output from the battery 111*d* is also supplied to the second inverter 113*f* via the relay box 113*d*, and the junction box 113*e*.

The second inverter 113*f* converts direct-current voltage (e.g., 350V) to be supplied from the battery 111*d* into alternate-current voltage (e.g., 100 V), and supplies the alternate-current voltage to the external power supply port 113*g*. Supply of alternate-current voltage from the second inverter 113*f* to the external power supply port 113*g* is performed based on a command to be output from the control device 113*a*.

The external power supply port 113*g* is configured to be connectable to an external connector (not illustrated) of the traveling machine body 11, and supplies electric power to the outside of the traveling machine body 11. That is, for example, connecting the external power supply port 113*g*, and external equipment (not illustrated) of the traveling machine body 11 to each other by using a power supply cable (not illustrated) including the connector enables to supply electric power of the battery 111*d* to the equipment. In other words, external power supply is enabled. The equipment includes, for example, an electric work machine (a pesticide spraying machine, a harvester, and the like), a mobile terminal (a personal computer, a smartphone, and the like). Therefore, in the present embodiment, a state in which electric power is supplied to the external power supply port 113*g* is referred to as a "state in which external power supply is possible". The external power supply port 113_g_ is, for example, provided in a right side portion of the machine body unit 111.

Note that, the connector may be provided in the equipment itself, and, in this case, electric power is supplied to the equipment by directly connecting the equipment to the external power supply port 113_g_.

Further, in the present embodiment, the first inverter 113_c_, and the second inverter 113_f_ are individually provided. However, the present invention is not limited to this configuration. For example, one inverter may be provided for the traveling actuator 111_b_1, the drive actuator 111_c_1, and the external power supply port 113_g_.

The DC-DC converter 113_h_ (also simply referred to as a converter) lowers direct-current high voltage (e.g., 350 V) to be supplied from the battery 111_d_ via the junction box 113_e_ to low voltage (e.g., 12 V). The low voltage battery 113_j_ is, for example, constituted of a lead battery. The low voltage battery 113_j_ is connected to the DC-DC converter 113_h_, and stores electric power in which voltage is lowered by the DC-DC converter 113_h_.

Electric power whose voltage is lowered by the DC-DC converter 113_h_ is supplied to each of the positioning communication unit 113_k_, the communication processing unit 113_m_, and the operation unit 113_n_, and each of the positioning communication unit 113_k_, the communication processing unit 113_m_, and the operation unit 113_n_ is actuated. Note that, a configuration of each of the positioning communication unit 113_k_, the communication processing unit 113_m_, and the operation unit 113_n_ is described later.

The plurality of pieces of hydraulic equipment 114 are disposed in the traveling machine body 11, particularly, on a lower side of a rear portion of the machine body unit 111. The plurality of pieces of hydraulic equipment 114 include a hydraulic pump 114_a_, a direction switching valve 114_b_, and a lifting actuator 114_c_. That is, the traveling machine body 11 includes the hydraulic pump 114_a_, the direction switching valve 114_b_, and the lifting actuator 114_c_.

In the present embodiment, the hydraulic pump 114_a_ internally includes an electric motor (not illustrated), and is constituted of an electric hydraulic pump to be driven by the electric motor. More specifically, the hydraulic pump 114_a_ is connected to the DC-DC converter 113_h_, and driven by electric power to be output from the DC-DC converter 113_h_. Note that, the hydraulic pump 114_a_ is not limited to an electric type, and, for example, may be a mechanical type. That is, it may be configured in such a way that an engine provided separately from the hydraulic pump 114_a_ serves as a drive source, an output shaft of the engine and an input shaft of the hydraulic pump 114_a_ are connected to each other, and the hydraulic pump 114_a_ is driven by power to be output from the engine.

Further, the hydraulic pump 114_a_ is connected to a hydraulic oil tank (not illustrated) that stores hydraulic oil. When electric power is supplied from the DC-DC converter 113_h_, and the hydraulic pump 114_a_ is driven, hydraulic oil in the hydraulic oil tank is supplied to the lifting actuator 114_c_ via the direction switching valve 114_b_. The direction switching valve 114_b_ controls a flow direction and a flow rate of hydraulic oil to be supplied to the lifting actuator 114_c_.

In the present embodiment, the lifting actuator 114_c_ is constituted of a hydraulic cylinder. More specifically, a base end portion of the lifting actuator 114_c_ is connected to the machine body unit 111, and a lead end portion thereof is connected to the hitch portion 13 (see FIG. 1). When the lifting actuator 114_c_ is expanded and contracted, the hitch portion 13 pivotally rotates in the up-down direction with respect to the traveling machine body 11. The work machine 12 is mounted to the hitch portion 13 as described above. Therefore, expanding and contracting the lifting actuator 114_c_ enables to move the work machine 12 in the up-down direction. That is, the lifting actuator 114_c_ raises and lowers the work machine 12. Note that, a configuration of the lifting actuator 114_c_ is not limited to that of a hydraulic cylinder, and, for example, the lifting actuator 114_c_ may be an electric cylinder.

4. Configuration of Control Device

Figure 4:
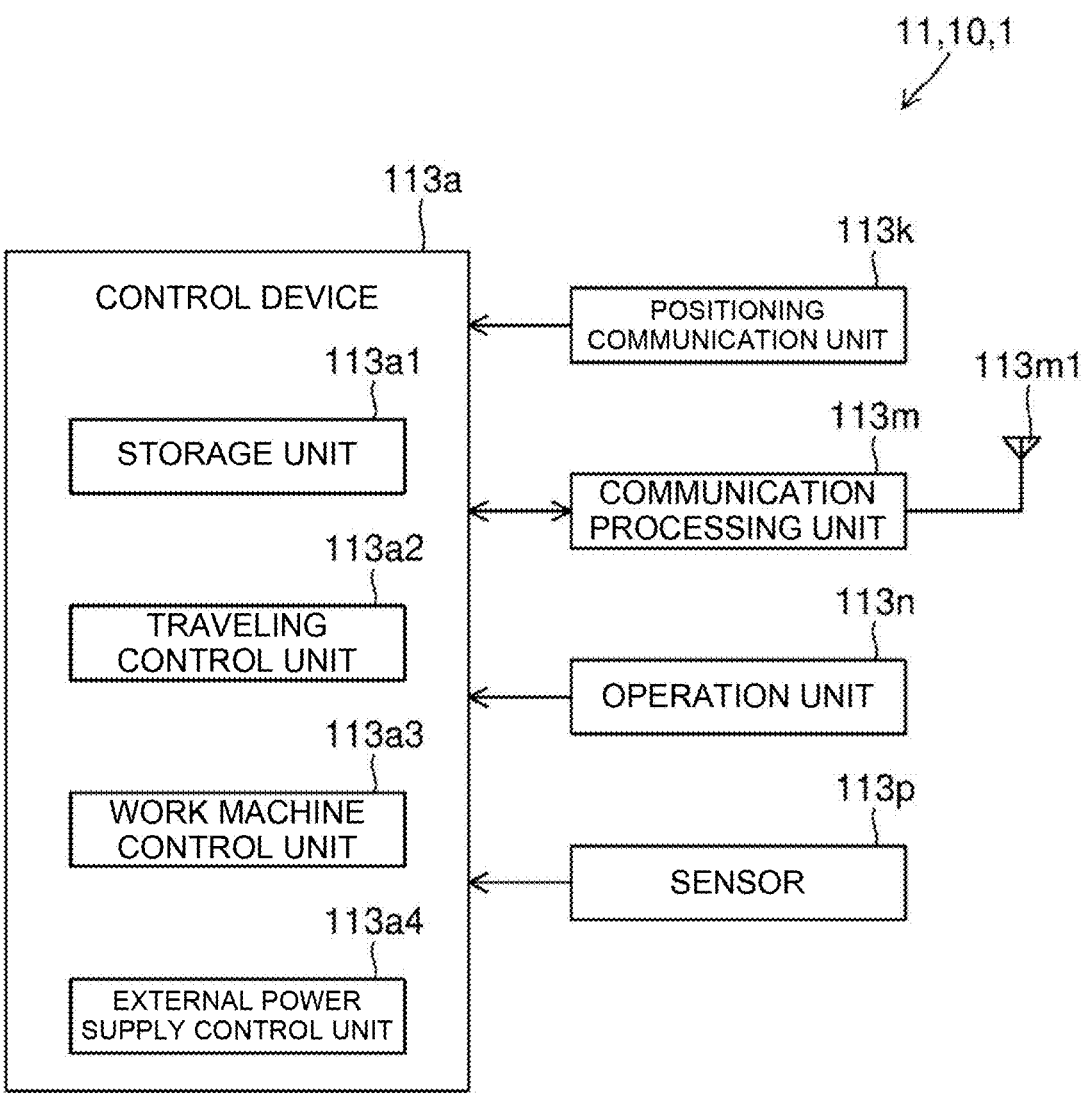
FIG. 4 is a block diagram schematically illustrating a configuration of a control device provided in the work vehicle.

A configuration of the control device 113_a_ is described with reference to FIG. 4. FIG. 4 is a block diagram schematically illustrating a configuration of the control device 113_a_. Note that, in FIG. 4, constituent elements necessary to describe the features of the present embodiment are illustrated, and description on general constituent elements is omitted.

The control device 113_a_ is configured to include, for example, an arithmetic device, an input/output unit, and a storage unit 113_a_1. The arithmetic device is, for example, a processor or a microprocessor. The storage unit 113_a_1 is a main storage device as exemplified by a read only memory (ROM) or a random access memory (RAM). The storage unit 113_a_1 may further include an auxiliary storage device as exemplified by a hard disk drive (HDD) or a solid state drive (SSD). Various types of programs, data, and the like are stored in the storage unit 113_a_1. The arithmetic device reads the various type of programs from the storage unit 113_a_1, and performs arithmetic processing in accordance with a program. The program stored in the storage unit 113_a_1 may be provided, for example, by a computer-readable non-volatile recording medium. As another example, the program may be provided from a program providing server via a communication line such as the Internet.

By cooperation of the hardware and software, the control device 113_a_ can act as a traveling control unit 113_a_2, a work machine control unit 113_a_3, and an external power supply control unit 113_a_4. The control device 113_a_ may be configured of one piece of hardware, or may be configured of a plurality of pieces of hardware communicable to one another.

Note that, as described above, each of the functional units 113_a_2 to 113_a_4 included in the control device 113_a_ may be achieved by causing the arithmetic device to perform arithmetic processing in accordance with a program, namely, by software, however, may be achieved by another method. At least one of the functional units 113_a_2 to 113_a_4 may be achieved by using, for example, an application specific integrated circuit (ASIC), a field programmable gate array (FPGA), or the like. That is, at least one of the functional units 113_a_2 to 113_a_4 may be achieved by hardware with use of a dedicated IC or the like. Further, at least one of the functional units 113_a_2 to 113_a_4 may be achieved by combining software and hardware. Further, each of the functional units 113_a_2 to 113_a_4 is a conceptual configuration. Therefore, a function to be executed by one constituent element may be distributed among a plurality of constituent elements, or functions included in a plurality of constituent elements may be integrated in one constituent element.

The traveling control unit 113_a_2 controls the traveling drive device 111_b_ (see FIG. 1) depending on whether the work vehicle 1 is traveling manually or traveling automatically (via the first inverter 113_c_). More specifically, during manual traveling, the traveling control unit 113a2 controls the traveling drive device 111b (particularly, the traveling actuator 111b1), based on a traveling instruction (e.g., a forward traveling instruction by the first operation lever 204a) from the remote control device 200. During automatic traveling, the traveling control unit 113a2 automatically (autonomously) controls the traveling drive device 111b (particularly, the traveling actuator 111b1) in such a way that the traveling machine body 11 travels along a predetermined route.

The work machine control unit 113a3 controls the hydraulic equipment 114 (particularly, the hydraulic pump 114a and the direction switching valve 114b), based on a lifting instruction from the remote control device 200 (see FIG. 3). The lifting instruction is achieved, for example, by allowing an operator to tilt the second operation lever 204b in the F1 direction or in the B1 direction (see FIG. 2).

More specifically, when an operator tilts the second operation lever 204b in the F1 direction, electric power is supplied from the DC-DC converter 113h to the hydraulic pump 114a, and the hydraulic pump 114a is driven. Note that, in a case where the second operation lever 204b is at a neutral position in the F1-B1 direction (in a case where the second operation lever 204b is not operated in the F1 direction or in the B1 direction), supply of electric power from the DC-DC converter 113h to the hydraulic pump 114a is cut off. Further, the direction switching valve 114b switches a flow direction of hydraulic oil to be supplied to the lifting actuator 114c in such a way that the lifting actuator 114c is expanded. Thus, the lifting actuator 114c is expanded, and the work machine 12 is raised.

Likewise, when the operator tilts the second operation lever 204b in the B1 direction, the hydraulic pump 114a is driven, and the direction switching valve 114b switches a flow direction of hydraulic oil in such a way that the lifting actuator 114c is contracted. Thus, the lifting actuator 114c is contracted, and the work machine 12 is lowered.

Further, the work machine control unit 113a3 controls the work machine drive device 111c (via the first inverter 113c), based on an on-off instruction (e.g., an on instruction by the second operation switch 205b) from the remote control device 200 (see FIG. 1). In particular, the work machine control unit 113a3 controls the drive actuator 111c1.

The external power supply control unit 113a4 performs control related to the external power supply function. For example, the external power supply control unit 113a4 controls the second inverter 113f, based on a command from the operation unit 113n, which is described later.

The control device 113a is connected to the positioning communication unit 113k, the communication processing unit 113m, and the operation unit 113n. Further, the control device 113a is connected to a sensor 113p, in addition to these components. Note that, the sensor 113p is also included in the electric equipment 113, as well as the positioning communication unit 113k and the like.

The sensor 113p detects information related to the vehicle body 10, and outputs the detected information to the control device 113a. In the present embodiment, the sensor 113p includes a plurality of types of sensors. Each of the plurality of types of sensors is connected in such a way that a signal can be input to the control device 113a. The plurality of types of sensors include, for example, an inertial measurement device, an obstacle sensor, a vehicle speed sensor, a lifting position sensor, and the like.

The inertial measurement device is a device including a 3-axis angular velocity sensor, and a 3-direction acceleration sensor, and capable of measuring a pose of the traveling machine body 11. The obstacle sensor is a sensor that detects an obstacle present in the vicinity of the vehicle body 10, and may be, for example, an ultrasonic sensor, a camera, a radar, light detection and ranging (LiDAR), or the like. The vehicle speed sensor is a sensor that detects a vehicle speed of the traveling machine body 11. The lifting position sensor is a sensor that detects a lifting position (height from the ground) of the work machine 12.

The positioning communication unit 113k includes the positioning antenna 111f (see FIG. 1), and acquires a position of the vehicle body 10, for example, as information on a latitude and a longitude with use of a positioning signal received from a positioning satellite by the positioning antenna 111f. The positioning communication unit 113k performs positioning, for example, by using a known real time kinematic GNSS (RTK-GNSS) method, after receiving a positioning signal from an unillustrated reference station by an appropriate method. The positioning communication unit 113k outputs position information on the vehicle body 10 to the control device 113a. Note that, the positioning communication unit 113k may perform positioning, for example, by using another method such as a differential GNSS (DGNSS) method. Further, the work vehicle 1 may be configured to include, for example, a quantum compass capable of positioning, in place of or in addition to the positioning communication unit 113k.

Note that, the positioning communication unit 113k, and some of the sensors 113p (e.g., the inertial measurement device) are used in a case where the work vehicle 1 automatically travels. That is, the positioning communication unit 113k, and some of the sensors 113p are not essential for the work vehicle 1 to travel based on an instruction from the remote control device 200.

The communication processing unit 113m performs communication with the remote control device 200 via the communication antenna 113m1. The communication antenna 113m1 is an antenna for performing wireless communication with the remote control device 200. For wireless communication, a wireless local area network (LAN) such as Wi-Fi (registered trademark) may be used.

The operation unit 113n is constituted of a touch panel. The touch panel allows the operation unit 113n to perform various settings on the work vehicle 1 (particularly, the traveling machine body 11), and display various pieces of information on the work vehicle 1 (particularly, the traveling machine body 11). That is, a screen (image) for performing the various settings is displayed on the operation unit 113n. The various settings include settings on the external power supply function. Note that, a display unit other than the operation unit 113n may be provided to display various pieces of information on the work vehicle 1. Further, the operation unit 113n is not limited to the above configuration, and, for example, may be constituted of a switch, a dial, a lever, or the like. Hereinafter, a configuration of a setting screen for the external power supply function to be displayed on the operation unit 113n is described.

5. Configuration of Setting Screen for External Power Supply Function

Figure 5:
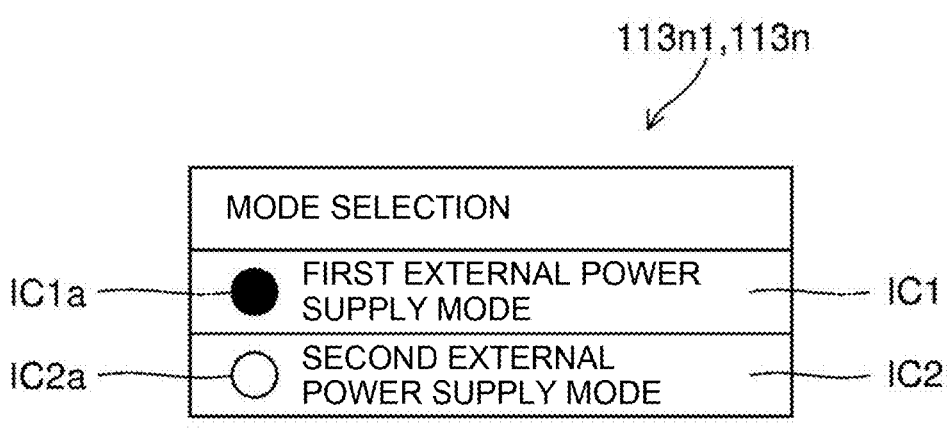
FIG. 5 is a diagram illustrating a configuration of a mode selection screen to be displayed on an operation unit provided in a traveling machine body of the work vehicle.
Figure 6:
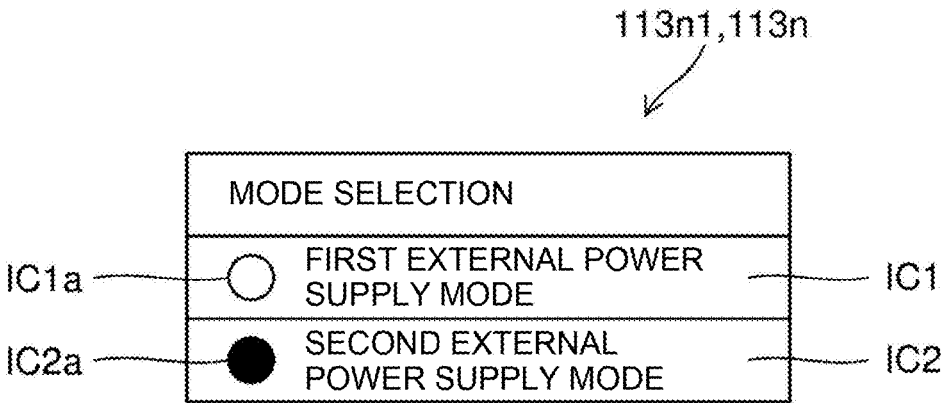
FIG. 6 is a diagram illustrating a configuration of the mode selection screen.

A setting screen for the external power supply function includes a mode selection screen 113n1 for performing selection of an external power supply mode (a first external power supply mode, and a second external power supply mode), and a state setting screen 113n2 for performing state settings on the external power supply function. First, a configuration of the mode selection screen 113n1 is described with reference to FIGS. 5 and 6. FIGS. 5 and 6 are diagrams illustrating a configuration of the mode selection screen 113*n*1.

The mode selection screen 113*n*1 includes a first external power supply mode selection icon IC1, and a second external power supply mode selection icon IC2. Further, the first external power supply mode selection icon IC1 includes a first external power supply mode display icon IC1*a*, and the second external power supply mode selection icon IC2 includes a second external power supply mode display icon IC2*a*. Note that, in FIGS. 5 and 6, in the first external power supply mode display icon IC1*a* and the second external power supply mode display icon IC2*a*, white filling (no filling) indicates light extinction, and black filling indicates lighting (or blinking).

The first external power supply mode selection icon IC1 enables to select the first external power supply mode in the external power supply function. The first external power supply mode display icon IC1*a* is turned on (or blinked), when the first external power supply mode is selected in the external power supply function (particularly, see FIG. 5). On the other hand, the first external power supply mode display icon IC1*a* is turned off, when the first external power supply mode is not selected, that is, the second external power supply mode is selected in the external power supply function (particularly, see FIG. 6).

The second external power supply mode selection icon IC2 enables to select the second external power supply mode in the external power supply function. The second external power supply mode display icon IC2*a* is turned on (or blinked), when the second external power supply mode is selected in the external power supply function (particularly, see FIG. 6). On the other hand, the second external power supply mode display icon IC2*a* is turned off, when the second external power supply mode is not selected, that is, when the first external power supply mode is selected in in the external power supply function (particularly, see FIG. 5).

Note that, in the present embodiment, the external power supply function is maintained in a disabled state (not enabled) alone by an operation of the first external power supply mode selection icon IC1 or the second external power supply mode selection icon IC2. This is described in detail later.

Figure 7:
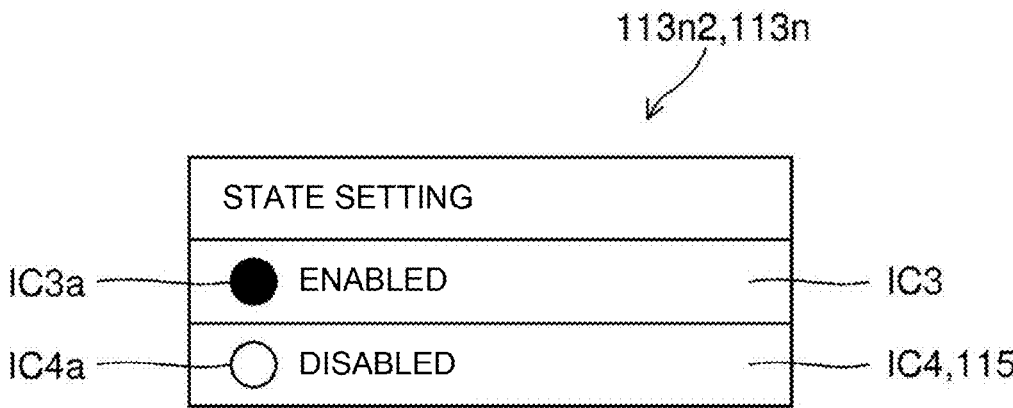
FIG. 7 is a diagram illustrating a configuration of a state setting screen to be displayed on the operation unit.
Figure 8:
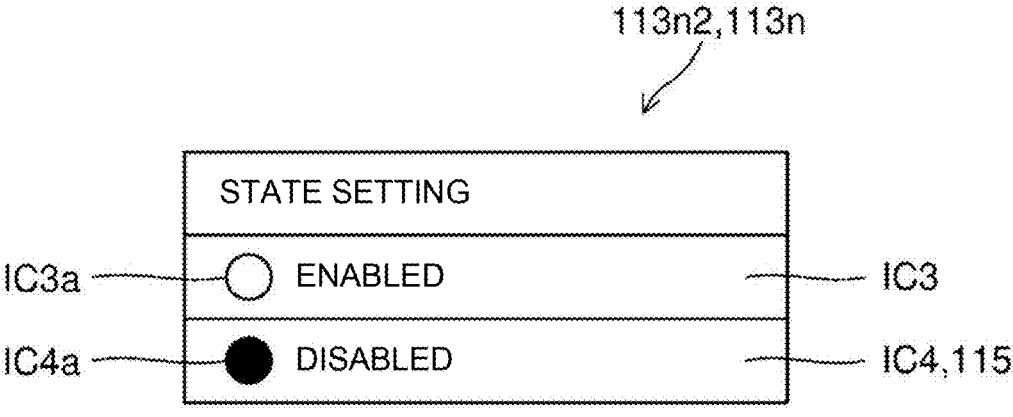
FIG. 8 is a diagram illustrating a configuration of the state setting screen.

Next, a configuration of the state setting screen 113*n*2 is described with reference to FIGS. 7 and 8. FIGS. 7 and 8 are diagrams illustrating a configuration of the state setting screen 113*n*2. The state setting screen 113*n*2 includes an enabled state setting icon IC3, and a disabled state setting icon IC4. Further, the enabled state setting icon IC3 includes an enabled state display icon IC3*a*, and the disabled state setting icon IC4 includes a disabled state display icon IC4*a*. Note that, in FIGS. 7 and 8, similarly to FIGS. 5 and 6, in the enabled state display icon IC3*a* and the disabled state display icon IC4*a*, white filling (no filling) indicates light extinction, and black filling indicates lighting (or blinking).

The enabled state setting icon IC3 enables setting on an enabled state (start) of the external power supply function. The enabled state display icon IC3*a* is turned on (or blinked), when the external power supply function is in an enabled state (in a state where external power supply is possible) (particularly, see FIG. 7), and is turned off, when the external power supply is in a disabled state (in a state where external power supply is not possible) (particularly, see FIG. 8).

The disabled state setting icon IC4 enables setting on a disabled state (finish) of the external power supply function. The disabled state display icon IC4*a* is turned on (or blinked), when the external power supply function is in a disabled state (particularly, see FIG. 8), and is turned off, when the external power supply function is in an enabled state (particularly, see FIG. 7). Note that, in the present embodiment, the external power supply function is in a disabled state at timing when the work vehicle 1 is activated. However, the external power supply function may be in an enabled state at timing when the work vehicle 1 is activated.

6. Details of External Power Supply Function

Figure 9A:
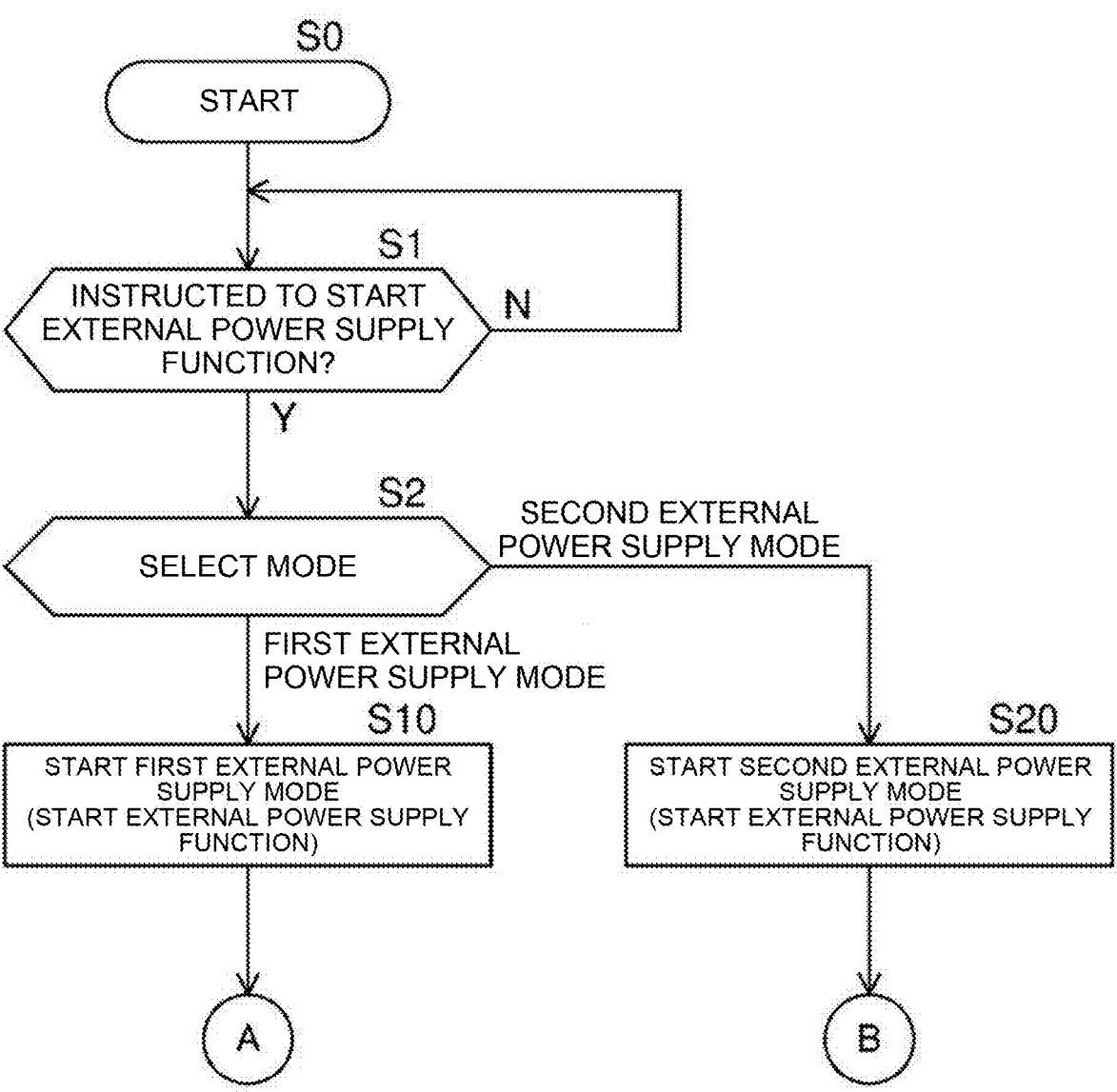
FIG. 9A is a flowchart illustrating an upstream side of a flow from start to finish of an external power supply function of the traveling machine body.
Figure 9B:
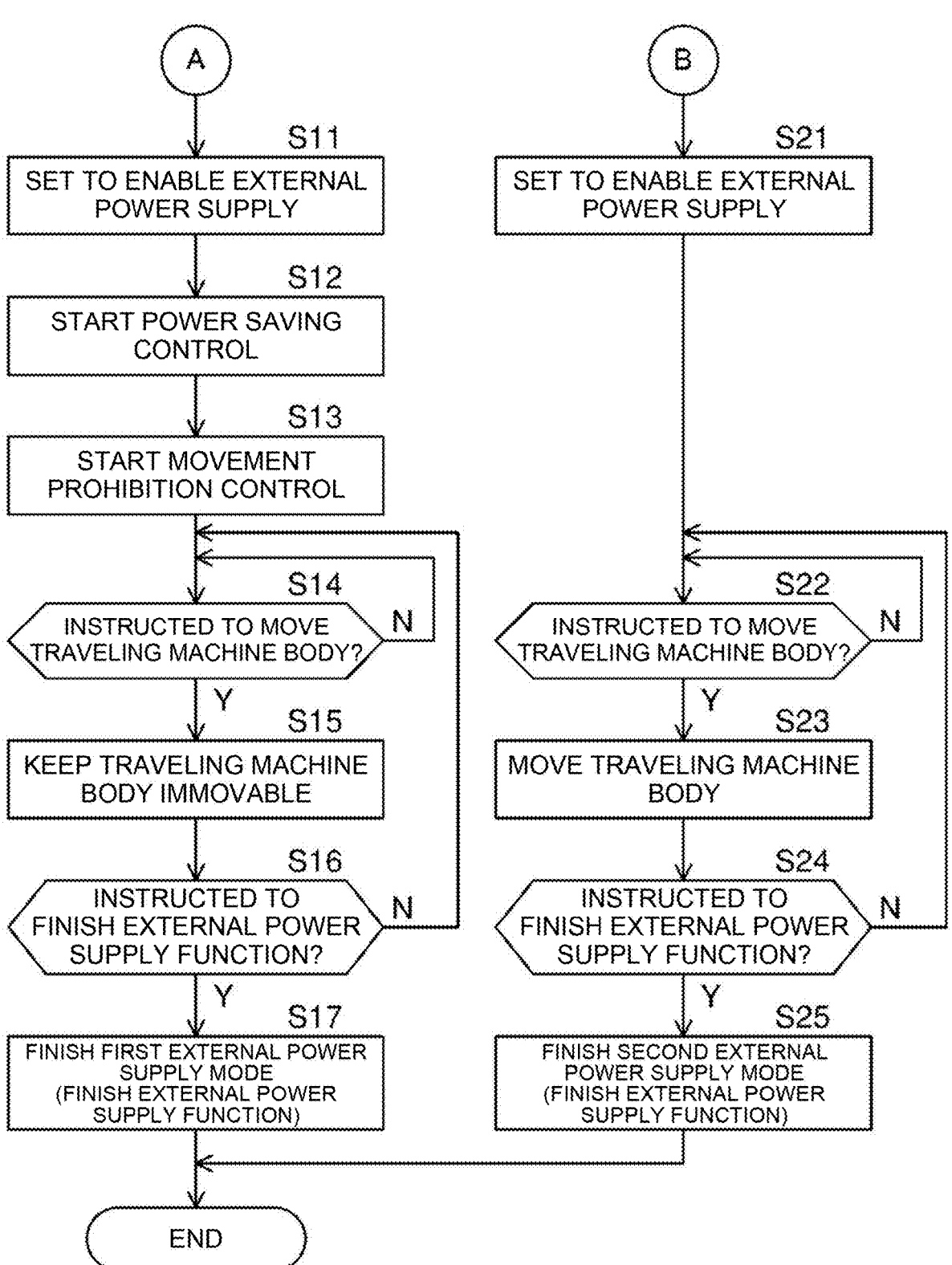
FIG. 9B is a flowchart illustrating a downstream side of the flow from start to finish of the external power supply function.

Details of the external power supply function are described with reference to FIGS. 9A and 9B. FIGS. 9A and 9B are flowcharts illustrating a flow from start to finish of the external power supply function. The flowchart illustrated in FIG. 9A, and the flowchart illustrated in FIG. 9B are connected by a connecting element A and a connecting element B. The flowchart illustrated in FIG. 9A is started, for example, at timing when the work vehicle 1 is activated. As described above, the external power supply function is in a disabled state at the timing when the work vehicle 1 is activated. Therefore, in step S0 (see FIG. 9A), it is assumed that the external power supply function is in a disabled state (not started).

As illustrated in FIG. 9A, in step S1, the external power supply control unit 113*a*4 (see FIG. 4) determines whether an instruction to start the external power supply function is present. In the present embodiment, the start instruction is achieved by allowing an operator to operate (touch) the enabled state setting icon IC3 on the state setting screen 113*n*2 (see FIGS. 7 and 8). In a case where the start instruction is present (Yes in step S1), the processing proceeds to next step S2. In a case where the start instruction is not present (No in step S1), the external power supply control unit 113*a*4 continues determination on the start instruction.

In step S2, the external power supply control unit 113*a*4 determines whether the first external power supply mode is selected, or the second external power supply mode is selected in the external power supply function. In the present embodiment, the selection is achieved by allowing an operator to operate one of the first external power supply mode selection icon IC1, and the second external power supply mode selection icon IC2 on the mode selection screen 113*n*1 (see FIGS. 5 and 6). In a case where the first external power supply mode is selected, the processing proceeds to step S10, and the first external power supply mode is started as the external power supply function. In a case where the second external power supply mode is selected, the processing proceeds to step S20, and the second external power supply mode is started as the external power supply function.

As illustrated in FIG. 9B, in step S11 (after the first external power supply mode is started), the external power supply control unit 113*a*4 sets the traveling machine body 11 to a state in which external power supply is possible. More specifically, the external power supply control unit 113*a*4 controls the second inverter 113*f*, and supplies alternate-current voltage (e.g., 100 V) to the external power supply port 113*g* (see FIG. 3). As described above, the alternate-current voltage is converted into direct-current voltage (e.g., 350 V), which is supplied from the battery 111*d* to the second inverter 113*f* by the second inverter 113*f*, and the direct-current voltage is generated. Thus, the traveling machine body 11 is brought to a state in which external power supply is possible. Therefore, for example, in this state, connecting the connector of the power supply cable to which the equipment (e.g., an electric work machine or the like) is connected to the external power supply port 113g enables to supply electric power from the battery 111d to the equipment. That is, in the first external power supply mode, electric power can be supplied from the battery 111d to the outside of the traveling machine body 11 (external power supply is possible). When the traveling machine body 11 is set to the state in which external power supply is possible, the processing proceeds to next step S12.

Note that, in the present embodiment, a condition for starting setting on the traveling machine body 11 to a state in which external power supply is possible by the external power supply control unit 113a4 includes presence of a setting switching instruction. In the present embodiment, the setting switching instruction is achieved by operating a switching operation unit (not illustrated) provided in the traveling machine body 11. That is, when the switching operation unit is operated in a state where the first external power supply mode is started, the traveling machine body 11 is switched between a state in which external power supply is possible, and a state in which external power supply is not possible. The switching operation unit is, for example, a seesaw switch. However, the present invention is not limited to the above configuration, and, for example, a configuration in which the setting switching instruction is omitted may be adopted. That is, it may be configured in such a way that, when the first external power supply mode is started, the external power supply control unit 113a4 sets the traveling machine body 11 to a state in which external power supply is possible (even if a setting switching instruction is not present).

In step S12, power saving control is started. The power saving control is described later. When the power saving control is started, the processing proceeds to next step S13.

In step S13, movement prohibition control is started by the traveling control unit 113a2 and the work machine control unit 113a3 (see FIG. 4 for both). More specifically, in the movement prohibition control, the traveling control unit 113a2 outputs, to the first inverter 113c, a command of setting the rotational speed of the traveling actuator 111b1 of the traveling drive device 111b to zero. Further, in the movement prohibition control, the work machine control unit 113a3 controls at least one of the hydraulic pump 114a, and the direction switching valve 114b in such a way as to stop driving of the lifting actuator 114c included in the hydraulic equipment 114. Further, in the movement prohibition control, the work machine control unit 113a3 outputs, to the first inverter 113c, a command of setting the rotational speed of the drive actuator 111c1 of the work machine drive device 111c to zero. Therefore, when the movement prohibition control is started, the traveling machine body 11 is disabled to move. That is, in the first external power supply mode, movement of the traveling machine body 11 prohibited. Further, movement of the traveling machine body 11 to be prohibited in the first external power supply mode includes traveling of the traveling machine body 11. When the movement prohibition control is started, the processing proceeds to next step S14.

Note that, the movement prohibition control is not limited to the above configuration. For example, the movement prohibition control may include at least one of control of the lifting actuator 114c, and control of the drive actuator 111c1 by the work machine control unit 113a3. That is, movement of the traveling machine body 11 to be prohibited in the first external power supply mode includes at least one of driving of the lifting actuator 114c, and driving of the drive actuator 111c1.

In step S14, the traveling control unit 113a2 and the work machine control unit 113a3 determine whether a movement instruction for the traveling machine body 11 is present. In the present embodiment, the movement instruction is achieved by allowing an operator to operate the remote control device 200 (see FIG. 2). For example, allowing an operator to tilt the first operation lever 204a in the F1 direction or in the B1 direction achieves a traveling instruction for the traveling machine body 11. Further, allowing the operator to tilt the second operation lever 204b in the F1 direction or in the B1 direction achieves a lifting instruction for the work machine 12, that is, a driving instruction for the lifting actuator 114c. Further, allowing the operator to operate the second operation switch 205b achieves a driving instruction for the work machine 12, that is, a driving instruction for the drive actuator 111c1.

Note that, the movement instruction is not limited to one of the traveling instruction for the traveling machine body 11, the driving instruction for the lifting actuator 114c, and the driving instruction for the drive actuator 111c1. For example, the movement instruction may be a combination of two or more of the traveling instruction for the traveling machine body 11, the driving instruction for the lifting actuator 114c, and the driving instruction for the drive actuator 111c1. That is, for example, a case where an operator tilts the second operation lever 204b in the F1 direction or in the B1 direction, while tilting the first operation lever 204a in the F1 direction or in the B1 direction is also included.

In a case where the movement instruction is present (Yes in step S14), the processing proceeds to next step S15. In a case where the movement instruction is not present (No in step S14), the traveling control unit 113a2 and the work machine control unit 113a3 continue determination on the movement instruction.

Figure 10:
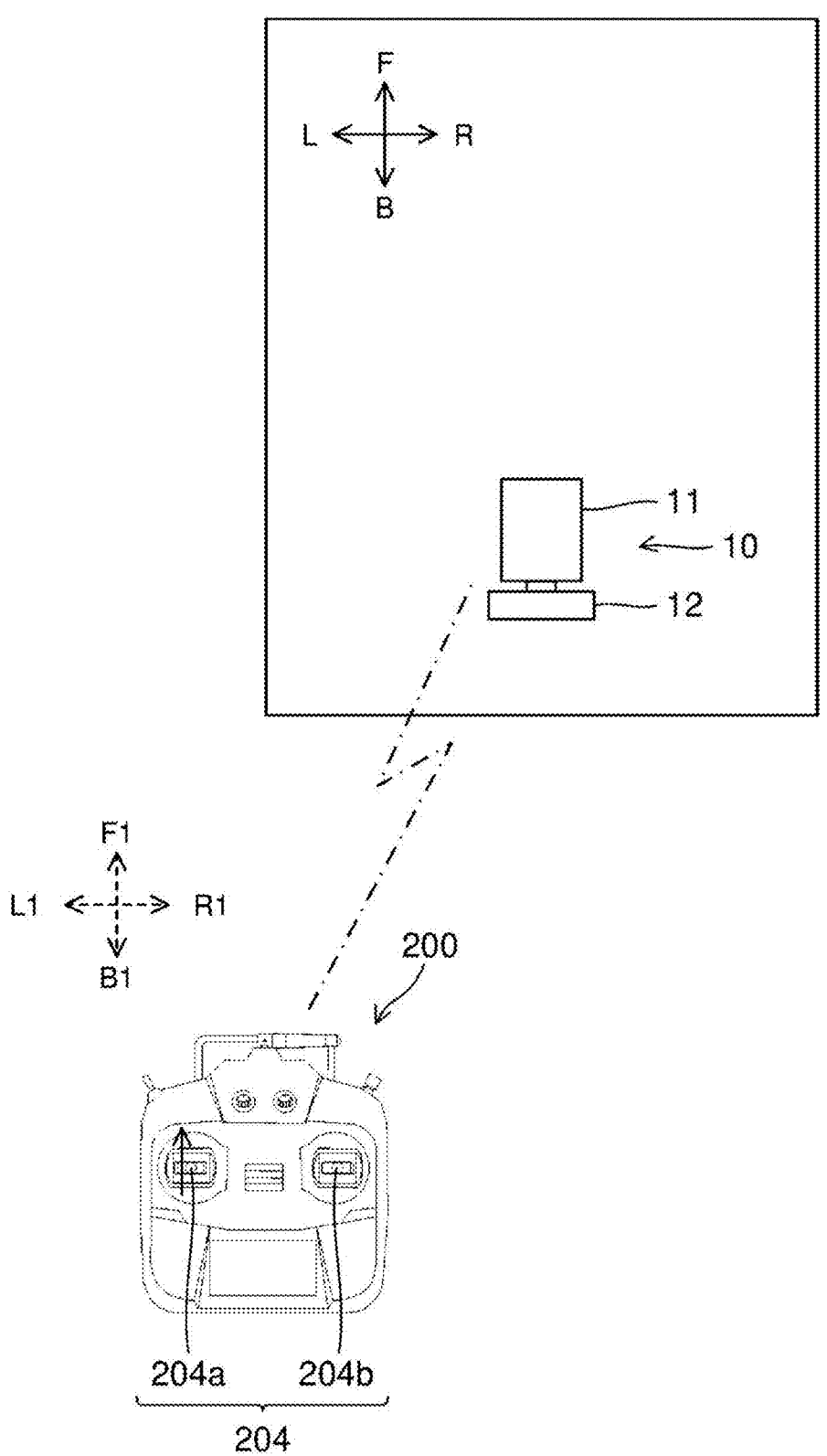
FIG. 10 is an explanatory diagram illustrating an example of movement of the traveling machine body in a case where a movement instruction for the traveling machine body is present in a first external power supply mode of the external power supply function.

In step S15, the traveling machine body 11 is disabled to move due to the movement prohibition control. More specifically, details are as follows. FIG. 10 is an explanatory diagram illustrating an example of movement of the traveling machine body 11 in a case where a movement instruction (a forward movement instruction) is present in the first external power supply mode. For example, when an operator tilts the first operation lever 204a in the F1 direction, a traveling instruction (a forward movement instruction) for the traveling machine body 11 is output. However, contrary to the traveling instruction, the traveling control unit 113a2 outputs, to the first inverter 113c, a command of setting the rotational speed of the traveling actuator 111b1 to zero. Thus, the rotational speed of the traveling actuator 111b1 becomes zero, and the traveling machine body 11 is maintained in a stopped state (does not travel).

Note that, even if a driving instruction for the lifting actuator 114c (a lifting instruction for the work machine 12) is present, the work machine control unit 113a3 controls at least one of the hydraulic pump 114a, and the direction switching valve 114b in such a way that driving of the lifting actuator 114c is stopped, despite of the driving instruction. Thus, the lifting actuator 114c stops driving, and the traveling machine body 11 is maintained in a stopped state (the work machine 12 is not raised or lowered).

Further, even if a driving instruction for the drive actuator 111c1 (a driving instruction for the work machine 12) is present, the work machine control unit 113a3 outputs, to the first inverter 113c, a command of setting the rotational speed of the drive actuator 111c1 to zero, despite of the driving instruction. Thus, the rotational speed of the drive actuator 111c1 becomes zero, and the traveling machine body 11 is maintained in a stopped state (the work machine 12 is not driven). Therefore, in the first external power supply mode, even if the traveling machine body 11 is operated by using the remote control device 200, the traveling machine body 11 is maintained in a stopped state. That is, in the first external power supply mode, an operation of the traveling machine body 11 by the remote control device 200 is prohibited.

Note that, the movement instruction (particularly, the traveling instruction) may be achieved by automatic traveling control. That is, for example, a traveling instruction for the traveling machine body 11 may be an instruction to be automatically (autonomously) generated by the traveling control unit 113*a*2 in such a way that the traveling machine body 11 travels along a predetermined route. However, even in this case, the traveling machine body 11 is maintained in a stopped state by the movement prohibition control.

As illustrated in FIG. 9B, in step S16, the external power supply control unit 113*a*4 determines whether a finishing instruction of the external power supply function is present. In the present embodiment, the finishing instruction is achieved by allowing an operator to operate (touch) the disabled state setting icon IC4 on the state setting screen 113*n*2 (see FIGS. 7 and 8). In a case where the finishing instruction is not present (No in step S16), the processing is returned to step S14. In a case where the finishing instruction is present (Yes in step S16), the first external power supply mode as the external power supply function is finished (released) (step S17).

Finishing of the first external power supply mode includes setting on the traveling machine body 11 to a state in which external power supply is not possible by the external power supply control unit 113*a*4, finishing of the power saving control, and finishing of the movement prohibition control. Setting on the traveling machine body 11 to a state in which external power supply is not possible by the external power supply control unit 113*a*4 is achieved by causing the external power supply control unit 113*a*4 to control the second inverter 113*f*, and cutting off supply of alternate-current voltage to the external power supply port 113*g*. Therefore, for example, in this state, even if the connector of the power supply cable to which the equipment (e.g., an electric work machine or the like) is connected is connected to the external power supply port 113*g*, electric power from the battery 111*d* is not supplied to the equipment.

Therefore, in the present embodiment, the first external power supply mode is released by an operation of the disabled state setting icon IC4. That is, in the present embodiment, the disabled state setting icon IC4 also has a function as a release operation unit 115 that performs setting on releasing of the first external power supply mode (see FIGS. 7 and 8). Further, as described above, the disabled state setting icon IC4 as the release operation unit 115 is provided on the operation unit 113*n* (particularly, on the state setting screen 113*n*2) disposed in the work vehicle 1. That is, the work vehicle 1 includes the release operation unit 115.

Note that, the release operation unit 115 is not limited to the above configuration. For example, the release operation unit 115 may have a configuration in which a dedicate icon for setting on releasing of the first external power supply mode is provided, or may have a configuration in which an input of a password is requested. Further, the release operation unit 115 may be provided independently of the operation unit 113*n*, or may be constituted of a switch, a dial, a lever, or the like.

In step S21 (after the second external power supply mode is started), similarly to step S11, the external power supply control unit 113*a*4 sets the traveling machine body 11 to a state in which external power supply is possible. That is, similarly to the first external power supply mode, also in the second external power supply mode, electric power can be supplied from the battery 111*d* to the outside of the traveling machine body 11 (external power supply is possible). Note that, since the processing of step S21 is similar to the processing of step S11, detailed description thereof is omitted. When the traveling machine body 11 is set to a state in which external power supply is possible, the processing proceeds to next step S22.

Note that, for example, in the second external power supply mode, connecting the connector of the power supply cable to the external power supply port 113*g* enables to supply electric power to the equipment to which the power supply cable is connected. However, at this occasion, even if the connector is detached from the external power supply port 113*g*, the second external power supply mode is continued (not released).

Further, in the present embodiment, as described above (in step S11), the condition for starting setting on the traveling machine body 11 to a state in which external power supply is possible by the external power supply control unit 113*a*4 includes presence of a setting switching instruction. That is, when the switching operation unit is operated in a state where the second external power supply mode is started, the traveling machine body 11 is switched between a state in which external power supply is possible, and a state in which external power supply is not possible. However, the present invention is not limited to the above configuration, and, for example, a configuration in which a setting switching instruction is omitted may be adopted. That is, as far as the second external power supply mode is started, the external power supply control unit 113*a*4 may set the traveling machine body 11 to a state in which external power supply is possible (even if a setting switching instruction is not present).

In step S22, similarly to step S14, the traveling control unit 113*a*2 and the work machine control unit 113*a*3 determine whether a movement instruction for the traveling machine body 11 is present. Note that, since the processing of step S22 is similar to the processing of step S14, detailed description thereof is omitted. In a case where the movement instruction is present (Yes in step S22), the processing proceeds to next step S23. In a case where the movement instruction is not present (No in step S22), the traveling control unit 113*a*2 and the work machine control unit 113*a*3 continue determination on the movement instruction.

Figure 11:
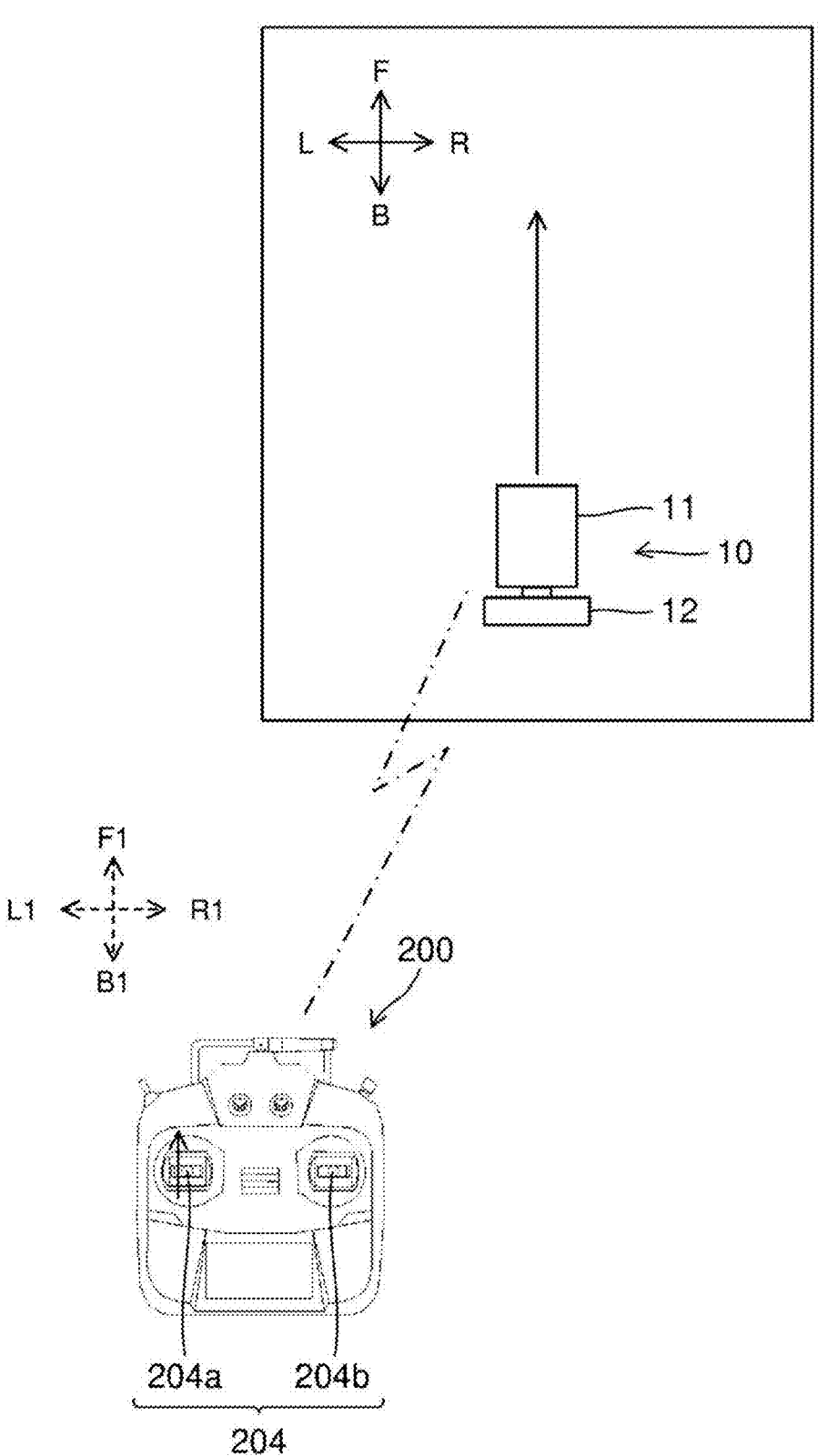
FIG. 11 is an explanatory diagram illustrating an example of movement of the traveling machine body in a case where a movement instruction for the traveling machine body is present in a second external power supply mode of the external power supply function.

In step S23, at least one of the traveling control unit 113*a*2, and the work machine control unit 113*a*3 controls the traveling machine body 11 in response to a movement instruction for the traveling machine body 11, and causes the traveling machine body 11 to move. That is, movement of the traveling machine body 11 is permitted in the second external power supply mode. More specifically, details are as follows. FIG. 11 is an explanatory diagram illustrating an example of movement of the traveling machine body 11 in a case where a movement instruction (a forward movement instruction) is present. For example, by allowing an operator to tilt the first operation lever 204*a* in the F1 direction, a traveling instruction (a forward movement instruction) for the traveling machine body 11 is output. Then, the traveling control unit 113*a*2 controls the traveling actuator 111*b*1 via the first inverter 113*c*, based on the traveling instruction. That is, for example, the traveling control unit 113*a*2 outputs, to the first inverter 113*c*, a command of setting the rotational speed of the traveling actuator 111*b*1 to a rotational speed associated with the traveling instruction. Thus, the traveling machine body 11 travels based on the traveling instruction.

Note that, in a case where a driving instruction for the lifting actuator 114*c* (a lifting instruction for the work machine 12) is present, the work machine control unit 113*a*3 controls the hydraulic pump 114*a* and the direction switching valve 114*b*, based on the driving instruction. More specifically, the work machine control unit 113*a*3 drives the hydraulic pump 114*a*, and switches the direction switching valve 114*b* in response to the driving instruction. Thus, the lifting actuator 114*c* is driven based on the driving instruction, and the work machine 12 is raised or lowered.

Further, in a case where a driving instruction for the drive actuator 111*c*1 (a driving instruction for the work machine 12) is present, the work machine control unit 113*a*3 controls the drive actuator 111*c*1 via the first inverter 113*c*, based on the driving instruction. More specifically, the work machine control unit 113*a*3 outputs, to the first inverter 113*c*, a command of setting the rotational speed of the drive actuator 111*c*1 to a predetermined rotational speed (e.g., a rated rotational speed). Thus, the drive actuator 111*c*1 is driven based on the driving instruction, and the work machine 12 is driven.

Note that, the movement instruction (particularly, the traveling instruction) may be achieved by automatic traveling control. That is, for example, a traveling instruction for the traveling machine body 11 may be an instruction to be automatically (autonomously) generated by the traveling control unit 113*a*2 in such a way that the traveling machine body 11 travels along a predetermined route. In this case, the traveling machine body 11 performs automatic traveling.

As illustrated in FIG. 9B, in step S24, similarly to step S16, the external power supply control unit 113*a*4 determines whether a finishing instruction of the external power supply function is present. Note that, since the processing of step S24 is similar to the processing of step S16, detailed description thereof is omitted. In a case where the finishing instruction is not present (No in step S24), the processing is returned to step S22. In a case where the finishing instruction is present (Yes in step S24), the second external power supply mode as the external power supply function is finished (step S25). Finishing of the second external power supply mode includes setting on the traveling machine body 11 to a state in which external power supply is not possible by the external power supply control unit 113*a*4 (see step S17).

According to the above configuration, in the work vehicle 1, when the first external power supply mode is started, the traveling machine body 11 is brought to a state in which electric power of the battery 111*d* can be supplied to the outside of the traveling machine body 11, and movement of the traveling machine body 11 is prohibited. Therefore, in a state where electric power of the battery 111*d* can be supplied to the outside of the traveling machine body 11 (a state in which external power supply is possible), for example, movement of the traveling machine body 11 due to an erroneous operation can be prevented. Thus, when the traveling machine body 11 is used as a power source, it is possible to prevent a user of the power source (the traveling machine body 11) located near the traveling machine body 11 from being damaged by movement of the traveling machine body 11. That is, it is possible to secure safety of the traveling machine body 11 in a state where eternal power supply is possible.

Further, in the work vehicle 1, when the second external power supply mode is started, since movement of the traveling machine body 11 is permitted, the traveling machine body 11 can be moved, while electric power of the battery 111*d* is supplied to the outside of the traveling machine body 11 (external power supply is performed). Thus, for example, an electric work machine (a pesticide spraying machine or the like) can be electrically connected to the traveling machine body 11, and the work machine can perform work by being driven with electric power of the battery 111*d*. Alternatively, electrically connecting a chargeable mobile terminal (a personal computer or the like) different from the traveling machine body 11 to the traveling machine body 11 enables to charge the mobile terminal, while performing work by using the traveling machine body 11. That is, it is possible to secure convenience of the traveling machine body 11 in a state where external power supply is possible. Thus, it is possible to secure safety and convenience of the traveling machine body 11 in a state where external power supply is possible.

In the first external power supply mode, prohibiting traveling of the traveling machine body 11 among movement of the traveling machine body 11 enables to avoid traveling of the traveling machine body 11 in a state where external power supply is possible, and contact with a user (of the power source) located near the traveling machine body 11. In this viewpoint, as described in the present embodiment, it is desirable that movement of the traveling machine body 11 to be prohibited in the first external power supply mode includes traveling of the traveling machine body 11.

In a configuration in which the traveling machine body 11 includes the lifting actuator 114*c* that raises and lowers the work machine 12, prohibiting driving of the lifting actuator 114*c* in the first external power supply mode makes it impossible for the work machine 12 to rise and fall (the work machine 12 is not raised or lowered). Thus, it is possible to avoid that the work machine 12 is raised and lowered with the traveling machine body 11 being in a state where external power supply is possible, and contact of the work machine 12 with a user (of the power source) located near the work machine 12. Further, in a configuration in which the traveling machine body 11 includes the drive actuator 111*c*1 that drives the work machine 12, prohibiting driving of the drive actuator 111*c*1 in the first external power supply mode makes it impossible for the work machine 12 to drive (the work machine 12 is not driven). Thus, it is possible to avoid that the work machine 12 is driven with the traveling machine body 11 being in a state where external power supply is possible, and contact of the work machine 12 with a user located near the work machine 12. For example, as illustrated in FIG. 1, in a case where the work machine 12 is a tiller, contact of a claw (not illustrated) of the tiller in pivotal movement with a user located near the tiller is avoided. From a viewpoint as described above, as described in the present embodiment, it is desirable that movement of the traveling machine body 11 to be prohibited in the first external power supply mode includes at least one of driving of the lifting actuator 114*c*, and driving of the drive actuator 111*c*1.

In a configuration in which the work vehicle 1 includes the remote control device 200 that operates the traveling machine body 11, it is desirable to prevent the traveling machine body 11 in a state where external power supply is possible from moving due to an erroneous operation of the remote control device 200. In this viewpoint, as described in the present embodiment, it is desirable that an operation of the traveling machine body 11 by the remote control device 200 is prohibited in the first external power supply mode.

As far as the first external power supply mode is released via a manual release operation, it is possible to avoid that the first external power supply mode is automatically released, and the traveling machine body 11 starts to move and damages a user, despite that the user (of the power source) is located near the traveling machine body 11. In this viewpoint, as described in the present embodiment, it is desirable that the work vehicle 1 includes the release operation unit 115 that performs setting on releasing of the first external power supply mode.

Figure 12:
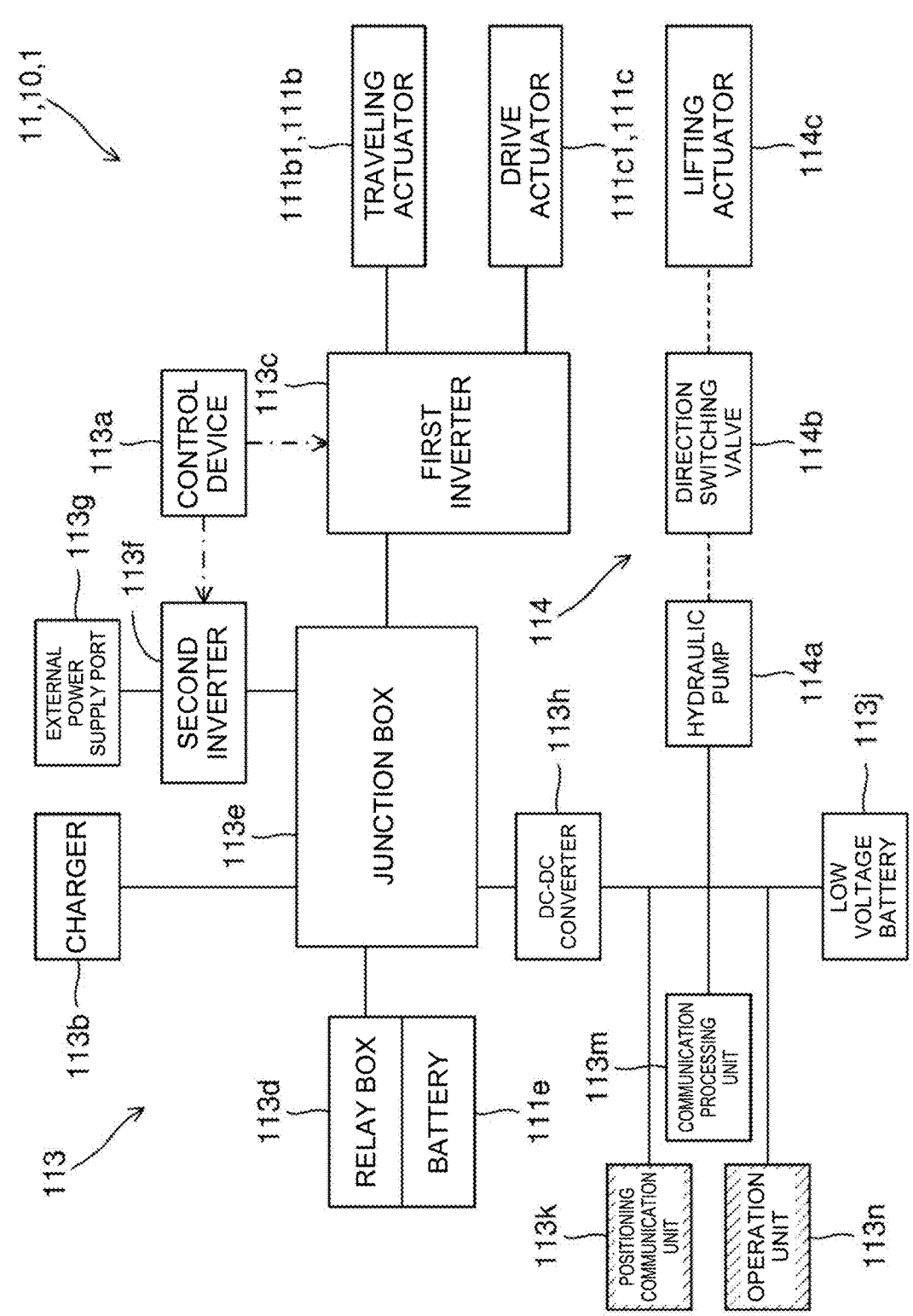
FIG. 12 is an explanatory diagram illustrating power saving control to be performed in the first external power supply mode.

Herein, the power saving control (see step S12 in FIG. 9B) is described with reference to FIG. 12. FIG. 12 is an explanatory diagram illustrating the power saving control. Note that, in FIG. 12, a hatched portion indicates target equipment for the power saving control.

The power saving control is provided to suppress electric power consumption of the traveling machine body 11. More specifically, when the power saving control is started, electric power consumption of the plurality of pieces of electric equipment 113 other than those required for the external power supply function (including the movement prohibition control) is suppressed. That is, for example, power supply of the positioning communication unit 113k is turned off, or the operation unit 113n is brought to a sleep state. Note that, the sleep state means a state in which a screen is not displayed, despite that power supply is in an on-state.

As described above, the positioning communication unit 113k is used for acquiring position information (e.g., a latitude and a longitude) of the vehicle body 10 (particularly, during automatic traveling), and is not used for the external power supply function. Therefore, in the external power supply function, the positioning communication unit 113k is not necessary. In the present embodiment, switching of power supply of the positioning communication unit 113k to an off-state is achieved by outputting a switching command to the off-state from the control device 113a to the positioning communication unit 113k. Note that, the above switching may be achieved by cutting off supply of electric power to the positioning communication unit 113k. Thus, electric power consumption of the traveling machine body 11 is reduced by the electric power consumption of the positioning communication unit 113k.

Since the operation unit 113n is constituted of a touch panel as described above, the operation unit 113n consumes electric power for screen display and the like. Further, the operation unit 113n enables various settings on the traveling machine body 11. However, when the first external power supply mode is started, the traveling machine body 11 is used as a power source. Therefore, there is no needs to operate the operation unit 113n other than an operation of finishing the first external power supply mode, and the operation unit 113n is not necessary. In the present embodiment, switching of the operation unit 113n to a sleep state is achieved by detecting that a non-operation state continues for a predetermined time (e.g., one minute) in the operation unit 113n. Note that, when the operation unit 113n is operated (touched) in the sleep state, a screen is displayed. Thus, electric power consumption of the traveling machine body 11 is reduced, as compared with a case where a screen of the operation unit 113n is continuously displayed. Note that, instead of setting the operation unit 113n to a sleep state, power supply of the operation unit 113n may be turned off. However, also in this case, it is preferable that, when the operation unit 113n in a power-off state is operated, power supply of the operation unit 113n is switched to an on-state, and a screen is displayed.

From a viewpoint that electric power for external power supply increases among electric power stored in the battery 111d, as illustrated in FIGS. 9B and 12, it is desirable that electric power consumption of the traveling machine body 11 is suppressed in the first external power supply mode.

Note that, the electric equipment 113 in which electric power consumption is suppressed by the power saving control is not limited to the positioning communication unit 113k, and the operation unit 113n. For example, in a case where the control device 113a is configured of a plurality of pieces of hardware, electric power consumption of the plurality of pieces of hardware other than those for use in the external power supply function may be suppressed. Thus, electric power consumption of the traveling machine body 11 is reduced by the electric power consumption of the hardware (hardware in which electric power consumption is suppressed).

7. Supplementary Description

In the present embodiment, a configuration in which movement prohibition control is started (performed), in a case where the traveling machine body 11 is in a state where external power supply is possible has been described. However, timing when the movement prohibition control is started is not limited to the above. For example, the movement prohibition control may not be started when the traveling machine body 11 is in a state where external power supply is possible, but may be started at timing when electric power is supplied from the battery 111d to the outside of the traveling machine body 11.

8. Supplementary Notes

The work vehicle 1 described in the present embodiment can also be expressed as a work vehicle described in the following supplementary notes.

A work vehicle of supplementary note (1) is a work vehicle provided with a traveling machine body in which a battery is disposed, the work vehicle including a first external power supply mode and a second external power supply mode in which electric power can be supplied from the battery to the outside of the traveling machine body, wherein in the first external power supply mode, movement of the traveling machine body is prohibited, and in the second external power supply mode, movement of the traveling machine body is permitted.

A work vehicle of supplementary note (2) is the work vehicle according to supplementary note (1), wherein movement of the traveling machine body includes traveling of the traveling machine body.

A work vehicle of supplementary note (3) is the work vehicle according to supplementary note (1) or (2), further including a work machine to be connected to the traveling machine body, wherein the traveling machine body includes a lifting actuator that raises and lowers the work machine, and a drive actuator that drives the work machine, and movement of the traveling machine body includes at least one of driving of the lifting actuator and driving of the drive actuator.

A work vehicle of supplementary note (4) is the work vehicle according to any one of supplementary notes (1) to (3), further including a remote control device that operates the traveling machine body, wherein in the first external power supply mode, an operation of the traveling machine body by the remote control device is prohibited.

A work vehicle of supplementary note (5) is the work vehicle according to any one of supplementary notes (1) to (4), wherein in the first external power supply mode, electric power consumption of the traveling machine body is suppressed.

A work vehicle of supplementary note (6) is the work vehicle according to any one of supplementary notes (1) to (5), further including a release operation unit that performs setting on releasing of the first external power supply mode.

The embodiment of the present invention has been described above, but the scope of the present invention is not limited thereto, and may be expanded or modified without departing from the gist of the invention.

INDUSTRIAL APPLICABILITY

The present invention is applicable, for example, to a work vehicle such as an agricultural machine and a construction machine.

REFERENCE SIGNS LIST

1 Work vehicle
11 Traveling machine body
12 Work machine
111c1 Drive actuator
111d Battery
114c Lifting actuator
115 Release operation unit
200 Remote control device

The invention claimed is:

1. A work vehicle provided with a traveling machine body in which a battery is disposed, the work vehicle comprising:

a first external power supply mode and a second external power supply mode, wherein electric power can be supplied from the battery to the outside of the traveling machine body in each of the first external power supply mode and the second external power supply mode, and a remote control device that operates the traveling machine body, wherein in the first external power supply mode, movement of the traveling machine body is prohibited, and wherein in the second external power supply mode, movement of the traveling machine body is permitted, and wherein in the first external power supply mode, an operating of the traveling machine body by the remote control device is prohibited.

2. The work vehicle according to claim 1, wherein movement of the traveling machine body includes traveling of the traveling machine body.

3. The work vehicle according to claim 1, further comprising:

a work machine to be connected to the traveling machine body, wherein the traveling machine body includes:

a lifting actuator that raises and lowers the work machine, and a drive actuator that drives the work machine, wherein movement of the traveling machine body includes at least one of driving of the lifting actuator and driving of the drive actuator.

4. The work vehicle according to claim 1, wherein in the first external power supply mode, electric power consumption of the traveling machine body is suppressed.

5. The work vehicle according to claim 1, further comprising a release operation unit that performs setting on releasing of the first external power supply mode.

* * * * *